July 16, 1957 — J. L. HARRIS — 2,799,847
CONTROL DEVICE AND SYSTEM
Filed April 21, 1951

INVENTOR
John L. Harris

United States Patent Office 2,799,847
Patented July 16, 1957

2,799,847
CONTROL DEVICE AND SYSTEM

John L. Harris, Whitefish Bay, Wis.

Application April 21, 1951, Serial No. 222,263

9 Claims. (Cl. 340—222)

This invention relates in general to automatic control devices and systems. The invention is more particularly concerned with timing devices for use in soup kitchens. In these devices the soup is heated in a portable soup cup which is plugged into the panel unit. The panel unit carries a timer which times the heating period of the soup cup so as to heat the soup to the proper temperature. In this apparatus it is desirable to provide an audible signal which notifies the attendant that the soup is ready for serving. It has been found desirable to cause this audible signal to operate whenever the soup cup is plugged in, so that the attendant does not forget to turn on the timer. In prior art systems, this result has been accomplished by providing a separate buzzer which is wired across the timer switch. It is the object of the present invention to provide the same results as obtained in the prior art devices, while at the same time eliminating the separate buzzer.

A further object of the invention is to provide a simple, rugged and low cost timing or switch mechanism.

Other objects will appear from the following description and the appended claims.

Figure 1:
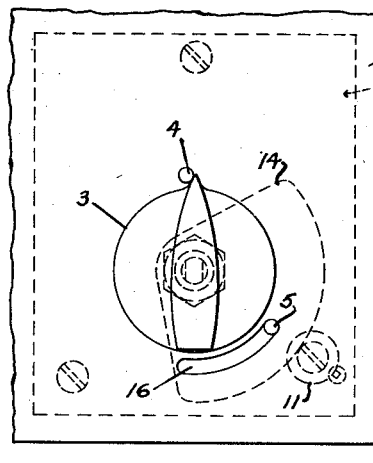
Figure 2:
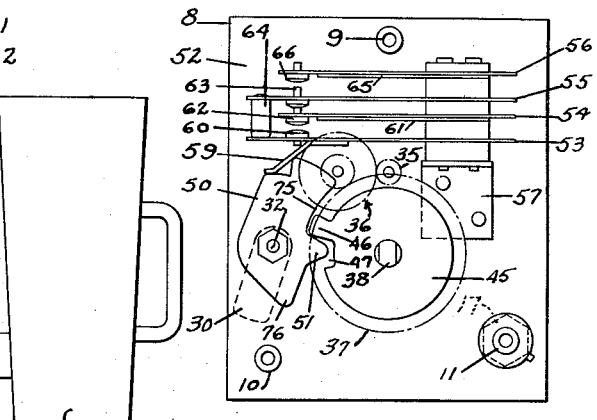
Figure 3:
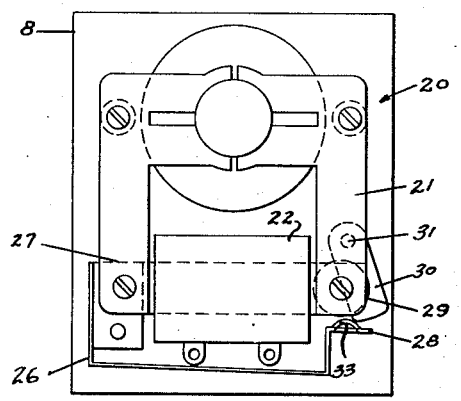
Figure 4:
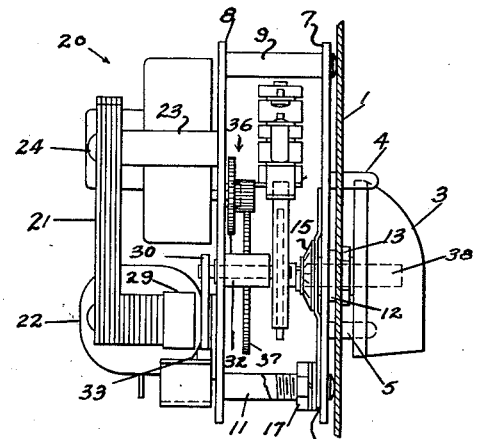
Figure 6:
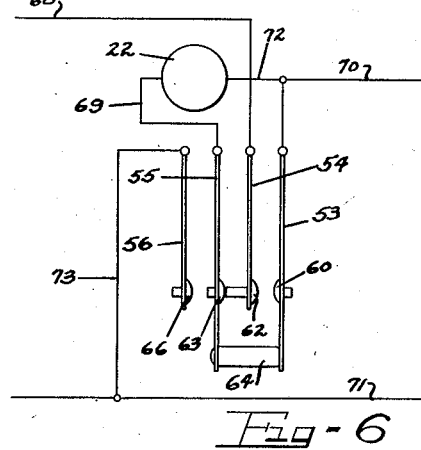
Figure 5:
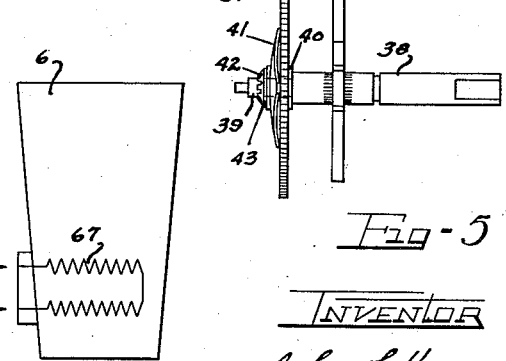

For a full disclosure of the invention reference is made to the following detailed description and to the accompanying drawings, in which;

Figure 1 indicates schematically a soup kitchen provided with the new timer,

Figure 2 is an elevation view of the timer with the front plate removed to show the internal construction, Figure 3 is a rear view of the timer, Figure 4 is a side view of the timer shown mounted on a panel, Figure 5 is an enlarged view of the cam shaft construction, and Figure 6 is a wiring diagram of the complete soup kitchen.

Referring to Figure 1, this figure shows schematically a soup kitchen having an enclosure 1. Located inside the enclosure is a timer generally indicated as 2. This timer is provided with a manual setting knob 3, which is limited in rotation by a fixed stop pin 4 and an adjustable stop pin 5. The soup kitchen also includes an external soup cup 6, which is adapted to be plugged into a suitable receptacle forming a part of the soup kitchen. The timer consists of a front plate 7 and a back plate 8, which are fastened together by spacers 9, 10 and 11. The plate is mounted on the enclosure 1 of the soup kitchen by means of a bearing member 12, which is staked on plate 7 and extends through an opening in the panel 1, being secured in place by a nut 13. Plate 7 also carries the stop pin 4, which extends through an opening in the panel. This pin serving to prevent the timer from turning on the panel. The stop pin 5 is mounted on a plate 14, which is pivoted on the rear of the bearing member 12 and held in place by a press-on type retainer 15. The stop pin (5) extends through coinciding arcuate slots 16 in both the front plate 7 and the panel 1. The edge of plate 14 (Figure 1) is arcuate in shape and located adjacent the spacer 11. A nut on the spacer serves to lock this plate in adjusted position. The stop pin 5 limits the manual clockwise rotation of the knob 3 and the adjustment shown provides a limited range of adjustment of the timing by the user.

Mounted on the back of the back plate 8 is a synchronous motor 20 of known construction. This motor includes a core assembly 21 carrying a coil 22. This motor is held in place by means of mounting spacers 23 and screws 24. Mounted on the plate 8 is also a sounder blade 26. This blade is provided with a mounting section 27 and extends across the coil 22, being suitably formed so as to clear this coil. The free end 28 of the sounder blade cooperates with an armature 29 which is mounted on the core assembly of the motor. It will be apparent that the sounder blade extends across the magnetic flux path of the motor and will vibrate with the frequency of the A. C. current, thereby giving an audible signal. In order to prevent this blade from sounding during the timing period, the sounder blade operator 30 is provided. This operator is mounted on a shaft 31 which extends through a bearing member 32 which is secured to the back plate 8. The sounder blade 26 is also provided with an offset portion 33 adjacent the operator 30. When the operator 30 is in the position shown, the sounder blade is free and will vibrate whenever the coil 22 is energized. However, when the sounder blade is rotated clockwise as seen in Figure 3, it engages the offset 33 of the blade, forcing the blade outwardly, which prevents it from vibrating.

The synchronous motor 20 is provided with a pinion 35, which through suitable reduction gearing 36 drives a final gear 37 mounted on the main shaft 38. A friction drive is provided between the gear 37 and shaft 38 so that this shaft may be turned by the knob 3 for manually setting the timer. As shown in Figure 5, the shaft 38 is provided with a reduced portion 39 over which the gear fits. A fibre retainer washer 40 is located between the gear and the shoulder formed by the reduction of shaft diameter. A spring tension washer 41 is located on the opposite side of the gear and is held in place by a press-on type retainer 42. Preferably a fibre washer 43 is located between the retainer and the tension washer.

The shaft 38 carries a cam 45. This cam is generally circular in shape, except for the projecting portion 46 and a notch 47 adjacent the projecting portion. This cam operates a cam follower or switch operator 50, which is carried by the shaft 32, which also carries the sounder blade operator 30. The cam follower 50 is provided with a projection 51 which extends into notch 47 of the cam 45 when the parts are in the positions shown in Figure 2. The cam follower 50 also serves as a cam for operating a switch mechanism generally indicated as 52. This mechanism consists of four separate switch blades 53, 54, 55 and 56, which are mounted as a stack and insulated from each other. This switch stack is carried by a bracket 57 which is mounted to the back plate 8. The lower switch blade 53 is biased downwardly and carries a bracket or offset 59, which engages the operating member 50. This switch blade also carries a contact 60 and extends beyond the contact. The switch blade 54 is also biased downwardly and is provided with a positive stop 61. This blade carries a double contact 62 which is adapted to engage either contact 60 or contact 63 on blade 55. The blade 55 also carries a fibre insulating pin 64 which engages blade 53 so that blades 53 and 55 are operated together. The blade 56 is biased downwardly and is provided with a positive stop 65 to limit its downward movement.

Operation

With the parts in the positions shown, the timer is in the off position. In this position contacts 60—62 and 63—66 are separated, while contact 63 engages contact 62. Also the sounder blade operator 30 is positioned to release the sounder blade 26 for operation. Referring to the wiring diagram of Figure 6, it will be noted that the following circuit is completed through the timer motor coil 22 and the soup cup heater 67 in series; from line wire 68, switch blade 54, contacts 62 and 63, switch blade 55, wire 69, timer motor coil 22, wire 70 and soup cup heater 67 to line wire 71. Thus, if the soup cup 6 is in place, the timer motor coil 22 will be energized in series with the soup cup heater 67. Due to the impedance of the heater 67 being much greater than that of the coil 22, the voltage drop through heater 67 is inconsequential and the timer motor coil is energized at substantially full line voltage. As the timer motor is energized and the sounder blade 26 is free to vibrate, this blade will give an audible signal until either the soup cup is removed or the timer is turned on.

Assuming that the soup cup has been filled and plugged in, the timer will give an audible signal which reminds the operator to turn on the timer. This is done by rotating the knob 3 until it strikes the stop pin 5. This causes rotation of the cam shaft, which rotation is permitted by the slip friction drive between the cam shaft and the gear 37. As the cam is rotated clockwise, the lower edge of the notch 47 in the cam strikes the projection 51 of operator 50, this causing counterclockwise rotation of the operator as seen in Figure 2. This movement of the operator raises the switch blade 53 and also raises the switch blade 55 through the insulating button 64. This movement causes contacts 62 and 63 to disengage and simultaneously causes contacts 60 and 62 to engage and also causes contacts 63 and 66 to engage. The cam and member 50 are proportioned so that the movement of member 50 caused by the cam causes the circular upper edge of the cam to pass under the bracket 59 on switch blade 53. Due to the bracket 59 now riding on the circular portion of member 50, the biasing effect of the switch has no rotative effect on this member. As the member 50 and the sounder blade operator 30 are in fixed angular relationship on the shaft 32, the movement of the member 50 in turning on the timer causes the operator 30 to move in a counterclockwise direction, as seen in Figure 3; thus coming under the sounder blade, thereby preventing it from vibrating.

Referring to Figure 6, the new switch positions provides the following circuit for energizing the soup cup heater 67; from line wire 68 switch blade 54 contacts 62—60, switch blade 53, wire 70 and soup cup heater 67 to line wire 71. The timer motor is energized as follows: Line wire 68, switch blade 54, contacts 62—60, wire 72, timer motor 22, wire 69, switch blade 55, contacts 63—66, switch blade 56, and wire 73 to line wire 71.

From the foregoing it will be seen that the result of turning the knob 3 clockwise is to energize the timer motor and the soup cup heater in parallel relationship, and to dampen the sounder blade so that it will not vibrate. Due to the timer motor now being energized, it will drive the cam shaft 38 in a counterclockwise direction, as seen in Figure 2. As the end of the predetermined time period expires, the lower side of the projection 46 on the cam will engage the projection 51 of the operating member 50, thus causing clockwise rotation of this member and also of the sounder blade operator 30. When the edge of the circular portion of member 50 rides unto the incline portion of the bracket 59, the biasing effect of the switch blades causes sudden clockwise rotation of the member 50, which returns the switch mechanism to the position shown in Figure 2. It also moves the sounder blade operator clear of the sounder blade 26, so that this blade may now vibrate to give an audible signal. This snap action movement is permitted by lost motion of projection 51 in notch 47. Due to the contacts 62 and 63 being again engaged, the timer motor coil is once again energized in series with the soup cup heater 67, so that an audible signal is given at the same time that the soup cup heater 67 is deenergized. This signal will continue until the operator removes the soup cup from the unit. At this time the circuit through the timer motor is broken as earlier described. It should be noted that if the user repalces the soup cup in the socket while the timer is turned off, the timer will instantaneously give an audible signal which requires that the user withdraw the cup from the socket. Thus the normal position for the soup cup when not in use is the disconnected position, which prevents damage to the soup cup due to accidentally turning on of the timer when the soup cup is empty.

While the timer is especially adaptable to soup kitchens, it is also useful in other applications where the stop pins 4 and 5 may be omitted. In such case the rotation of the shaft is limited by the construction of the cam 45 and the member 50. It should be noted that when the cam is rotated in a counterclockwise direction as seen in Figure 2, the outer edge of the projection 46 of the cam will be engaged by the portion 75 of the member 50 above the projection 51. This arrangement prevents further counterclockwise rotation of the cam and also limits the clockwise rotation of the member 50.

When the cam 45 is rotated clockwise to its other limit of rotation, the projection 46 on the cam engages the extension 76 on the operating member 50. This provides a stop for the clockwise movement of the cam shaft. At this time the extension 76 engages the periphery of the cam, and thus in addition to providing a stop for the clockwise rotation of the cam, also acts as a stop for the counterclockwise rotation of the member 50.

From the foregoing it will be apparent that the present invention provides a simple and positive timing mechanism and further provides a simplified control system which is especially adaptable for soup kitchens and analogous apparatus. While only one form of the invention has been shown and described in detail, it will be apparent that many variations may be made without departing from the spirit and the scope of the invention. It is, therefore, desired to be limited only by the following claims.

What is claimed is:

1. In a timer mechanism, the combination of a switch, a cam shaft carrying a cam, a timer motor for driving said cam shaft in one direction, manual setting means for setting the angular position of the cam shaft, a pivoted member interposed between the cam and said switch, one portion of said member engaging the cam for operation thereby and another portion engaging the switch for operation thereof, said cam and said member being constructed and arranged so that the member limits the rotation of the cam in both directions, signal means operated by the timer motor, and a control device for the signal means operated by said member.

2. In a timer mechanism, the combination of a switch, a cam shaft carrying a cam, a timer motor for driving said cam shaft in one direction, manual setting means for setting the angular position of the cam shaft, a pivoted member interposed between the cam and said switch, one portion of said member engaging the cam for operation thereby and another portion engaging the switch for operation thereof, a signal means operated by the timer motor, and a control device for the signal means operated by said member.

3. In a timer mechanism, the combination of a switch, a cam shaft carrying a cam, a synchronous timer motor for driving said cam shaft in one direction, manual setting means for setting the angular position of the cam shaft, a pivoted member interposed between said cam and said switch, one portion of said member engaging the cam for operation thereby and another portion engaging the switch for operation thereof, a sounder blade arranged in the magnetic field of said synchronous motor, a control member arranged selectively to engage or release said sounder blade, said control member being operated by said pivoted member.

4. In a control system for an electrical load, the combination of, a timer mechanism comprising a control member, a synchronous motor for driving said control member in one direction, manual setting means for setting said control member, means including a switch controlled by said control member and circuit connections for controlling the load, means independent of said switch for breaking the circuit through said load, means for deenergizing the timer motor when said independent means is in position to break said circuit through the load and for energizing the timer motor regardless of the position of said switch when said independent means is in position to permit completion of said circuit through the load, a sounder blade arranged in the magnetic circuit of said synchronous motor, and a control member for the sounder blade arranged to engage the sounder blade when the switch is closed and to release the sounder blade when the switch is open.

5. In a control system for an electrical load, the combination of, a timer mechanism comprising a control member, a synchronous motor for driving said control member in one direction, manual setting means for setting said control member, switching mechnaism controlled by said control member, circuit connections between said switching mechanism, the load and timer motor whereby the switching mechanism controls both the load and timer motor, said switching mechanism and circuit connections being arranged to energize the load and place the timer motor in parallel therewith when the switching mechanism is in one position, and to deenergize the load and place the timer motor in series therewith when the switching mechanism is in another position, a sounder blade arranged in the magnetic circuit of the synchronous motor, and a control member for the sounder blade arranged to engage the sounder blade when the switching mechanism is in said one position, and to release the sounder blade when the switching mechanism is in said other position.

6. In a control system for an electrical load, the combination of, a timer mechanism comprising a control member, an alternating current motor for driving said control member in one direction, manual setting means for setting said control member, means including a switch controlled by said control member and circuit connections for controlling the load, means independent of said switch for breaking the circuit through said load, means for deenergizing the timer motor when said independent means is in position to break said circuit through the load and for energizing the motor regardless of the position of said switch when said independent means is in position to permit completion of said circuit through the load, a sounder blade arranged in the magnetic circuit of said motor, a control member for the sounder blade arranged selectively to engage or release the same, and means operated by said motor for operating said last mentioned member.

7. In a control system for an electrical load, the combination of, a timer mechanism comprising a control member, an alternating current motor for driving said control member in one direction, manual setting means for setting said control member, switching mechanism controlled by said control member, circuit connections between said switching mechanism, the load and timer motor whereby the switching mechanism controls both the load and timer motor, said switching mechanism and circuit connections being arranged to energize the load and place the timer motor in parallel therewith when the switching mechanism is in one position, and to deenergize the load and place the timer motor in series therewith when the switching mechanism is in another position, a sounder blade arranged in the magnetic circuit of the motor, a control member for the sounder blade arranged selectively to engage or release the same, and means operated by said motor for operating said last mentioned member.

8. In a timer mechanism, the combination of a switch including an operating element biased in one direction, a freely pivoted operating member for engaging said operating element, said operating member constituting a cam having a generally circular raised portion and an inclined portion, rotation of said member in one direction causing movement of the element against its bias, said member being movable to a position in which the generally circular raised portion thereof engages said element whereby the return action of said element on said member becomes neutralized, a cam shaft, a notched cam on said shaft, said operating member having a projection adapted to extend into said notch whereby one side of the notch causes motion of the mmeber in one direction and the other side of the notch causes motion of the member in the opposite direction, the notch being wider than the projection to provide lost motion between the cam and operating member sufficient to operate the switch from one of its positions to another, an alternating current motor for operating said cam shaft, a sounder blade arranged in the magnetic field of said motor, a control member arranged selectively to engage or release said sounder blade, said control member being operated by said pivoted operating member.

9. In a timer mechanism, the combination of a switch including an operating element biased in one direction, a freely pivoted operating member for engaging said operating element, said operating member constituting a cam having a generally circular raised portion and an inclined portion, rotation of said member in one direction causing movement of the element against its bias, said member being movable to a position in which the generally circular raised portion thereof engages said element whereby the return action of said element on said member becomes neutralized, a cam shaft, a notched cam on said shaft, said operating member having a projection adapted to extend into said notch whereby one side of the notch causes motion of the member in one direction and the other side of the notch causes motion of the member in the opposite direction, the notch being wider than the projection to provide lost motion between the cam and operating member sufficient to operate the switch from one of its positions to another, an alternating current motor for operating said cam shaft, a sounder blade arranged in the magnetic field of said motor, a control member arranged selectively to engage or release said sounder blade, and means operated by the cam shaft for actuating said control member.

References Cited in the file of this patent

UNITED STATES PATENTS 2,509,693    Morrison _____ May 30, 1950